(12) United States Patent
Forutanpour

(10) Patent No.: US 7,920,186 B2
(45) Date of Patent: Apr. 5, 2011

(54) METHOD AND APPARATUS FOR DEFECTIVE PIXEL DETECTION BASED ON THE HUMAN VISUAL SYSTEM

(75) Inventor: Babak Forutanpour, Carlsbad, CA (US)

(73) Assignee: Qualcomm Incorporated, San Diego, CA (US)

( * ) Notice: Subject to any disclaimer, the term of this patent is extended or adjusted under 35 U.S.C. 154(b) by 1180 days.

(21) Appl. No.: 11/506,350

(22) Filed: Aug. 18, 2006

(65) Prior Publication Data

US 2007/0165118 A1      Jul. 19, 2007

Related U.S. Application Data

(60) Provisional application No. 60/760,669, filed on Jan. 19, 2006.

(51) Int. Cl.
*H04N 5/232* (2006.01)

(52) U.S. Cl. ....................................................... 348/246

(58) Field of Classification Search .................. 348/246, 348/247
See application file for complete search history.

(56) References Cited

U.S. PATENT DOCUMENTS

| 6,683,643 | B1 * | 1/2004 | Takayama et al. | 348/247 |
| 7,443,433 | B2 * | 10/2008 | Hara | 348/246 |
| 2005/0248671 | A1 * | 11/2005 | Schweng | 348/246 |

FOREIGN PATENT DOCUMENTS

| EP | 1289309 A1 | 3/2003 |
| EP | 1594308 A1 | 11/2005 |
| EP | 1605403 A1 | 12/2005 |
| WO | 2004004319 A1 | 1/2004 |

\* cited by examiner

*Primary Examiner* — Tuan Ho

(57) ABSTRACT

A bad pixel detection method and module which provide a quick-test and a full-test for bad pixel detections in an image. The quick-test tests a current pixel to one and only one good neighbor having been previously tested. The quick-test is optimized by exploiting weaknesses in the human visual system especially for red and blue colors. More lenient thresholds can be used for the blue color compared to thresholds for the red and green colors. Moreover, the full-test is constructed and arranged to detect bad pixel clusters in a kernel.

29 Claims, 6 Drawing Sheets

| R11 | G21 | R31 | G41 | R51 | G61 |
|-----|-----|-----|-----|-----|-----|
| G12 | B22 | G32 | B42 | G52 | B62 |
| R13 | G23 | R33 | G43 | R53 | G63 |
| G14 | B24 | G34 | B44 | G54 | B64 |
| R15 | G25 | R35 | G45 | R55 | G65 |
| G16 | B26 | G36 | B46 | G56 | B66 |

FIG. 1

(Prior Art)

METHOD AND APPARATUS FOR DEFECTIVE PIXEL DETECTION BASED ON THE HUMAN VISUAL SYSTEM

RELATED APPLICATIONS

This application claims priority to U.S. Provisional Application No. 60/760,669, filed Jan. 19, 2006 entitled A Method for Defective Pixel Detection Based on the Human Visual System.

BACKGROUND OF THE INVENTION

I. Field of the Invention

The present invention relates to the principals of image processing and, more specifically, to the detection and correction of pixels within a digital image having color values that may not have actually been in the original scene when the photo was taken. Such pixels are common due to dust particles or imperfections in CDD or CMOS photo array elements. In particular, the proposed method involves using lenient thresholds based on unperceivable differences by the human visual system to perform a quick-test of each pixel with its immediately surrounding neighbors. The present invention also relates to a bad pixel detection module and to program instructions executable by a processor for bad pixel detection.

II. Background

A defective image pixel is defined as a pixel whose response is considerably different than the value of its neighbors. Dust particles or microlens defects are two common reasons why a given pixel could report erroneous values.

A common method for bad pixel detection is to mark a given pixel as defective if it's response is some percentage or fixed threshold greater than the maximum, or some percentage or fixed threshold less than the minimum of it's neighbor's values. This process requires numerous read accesses from system memory followed by numerous logical comparisons to compute the maximum and minimum of each neighboring pixels neighbors.

There is a need to perform bad pixel detection at considerably faster speeds than current known methods. The speed at which bad pixel detection is performed can be optimized over prior methods by exploiting weaknesses in the human visual system. In short, more lenient thresholds can be used for the red color compared to thresholds green colors, and even more lenient threshold for blue color compared to red and green colors.

Furthermore, the red, green and blue thresholds can be further relaxed depending on the candidate pixel's magnitude.

SUMMARY OF THE INVENTION

In view of the above, it is an object of the present invention to provide a method for bad pixel detection at a considerably faster speed than current known methods.

A further object of the present invention is to provide a bad pixel detection scheme that performs a quick test on a pixel using a good neighbor pixel of the same color.

A further object of the present invention is to provide a bad pixel detection scheme that exploits weaknesses in the human visual system to optimize the speed of pixel detection.

A further object of the present invention is to provide a bad pixel detection scheme which employs more lenient thresholds for the red color pixels compared to thresholds of green color pixels, and even more lenient thresholds for blue color pixels compared to red and green color pixels.

A further object of the present invention is to provide a bad pixel detection scheme where the red, green and blue thresholds can be further relaxed depending on the candidate pixel's magnitude.

The foregoing and other objects of the present invention are carried out by a bad pixel detection module comprising a quick-test bad pixel detection sub-module operable to compare a difference between a pixel value of a current pixel in an image and a pixel value of only one good neighbor pixel to a threshold selected to create zero noticeable bad pixels in the image.

The bad pixel detection module further includes a full-test bad pixel detection sub-module operable to full-test the current pixel to evaluate whether the current pixel is a bad pixel in a kernel only if the current pixel fails the quick-test.

The present invention also provides a bad pixel detection module comprising a quick-test bad pixel detection sub-module which is operable to compare a difference between a current pixel value of a color in an image and one good neighbor pixel value of the color to a largest threshold. The largest threshold is based on a human visual system response to the color to create zero noticeable bad pixels in the image. The module also includes a full-test bad pixel detection sub-module which is operable to evaluate whether a noticeable bad pixel is a bad pixel in a kernel by a full-test of the kernel.

The bad pixel detection module further includes a quick-test bad pixel detection sub-module which is operable to compare the current pixel value to one and only one previously tested good neighbor. The quick-test repeats the quick-test for the next untested pixel.

The bad pixel detection module also includes a full-test bad pixel detection sub-module to resume testing of the current pixel when the current pixel is found to be a noticeable bad pixel during the quick-test.

The bad pixel detection module sets the thresholds for some pixel shades of the red color more lenient than the thresholds for the green color.

The bad pixel detection module sets the thresholds for each pixel shade of a blue color more lenient than the threshold for a red color and a green color. Moreover, as the magnitude of the pixel values increase, the threshold for the pixel values become more lenient.

In another aspect, the present invention is directed to program instructions executable by a processor, the program instructions upon execution being operable to quick-test a current pixel by comparing a difference between a pixel value of the current pixel in an image and a pixel value of only one good neighbor pixel to a threshold selected to create zero noticeable bad pixels in the image.

The program instructions upon execution being operable to full-test the current pixel to evaluate whether the current pixel is a bad pixel in a kernel only if the current pixel fails the quick-test.

In yet another aspect, the present invention is directed to a method for bad pixel detection comprising the steps of quick testing a current pixel by comparing a difference between a current pixel value of a color in an image and one good neighbor pixel value of the color to a threshold based on a human visual system response to the color to create zero noticeable bad pixels in the image, and full testing a noticeable bad pixel to evaluate whether the noticeable bad pixel is a bad pixel in a kernel.

BRIEF DESCRIPTION OF THE DRAWINGS

The foregoing summary, as well as the following detailed description of preferred embodiments of the invention, will be better understood when read in conjunction with the accompanying drawings. For the purpose of illustrating the invention, there is shown in the drawings embodiments which are presently preferred. It should be understood, however, that the invention is not limited to the precise arrangement shown. In the drawings:

FIG. 1 shows a common Bayer pattern arrangement;

DETAILED DESCRIPTION OF THE PREFERRED EMBODIMENTS

While this invention is susceptible of embodiments in many different forms, this specification and the accompanying drawings disclose only some forms as examples of the use of the invention. The invention is not intended to be limited to the embodiments so described, and the scope of the invention will be pointed out in the appended claims.

Figure 3:
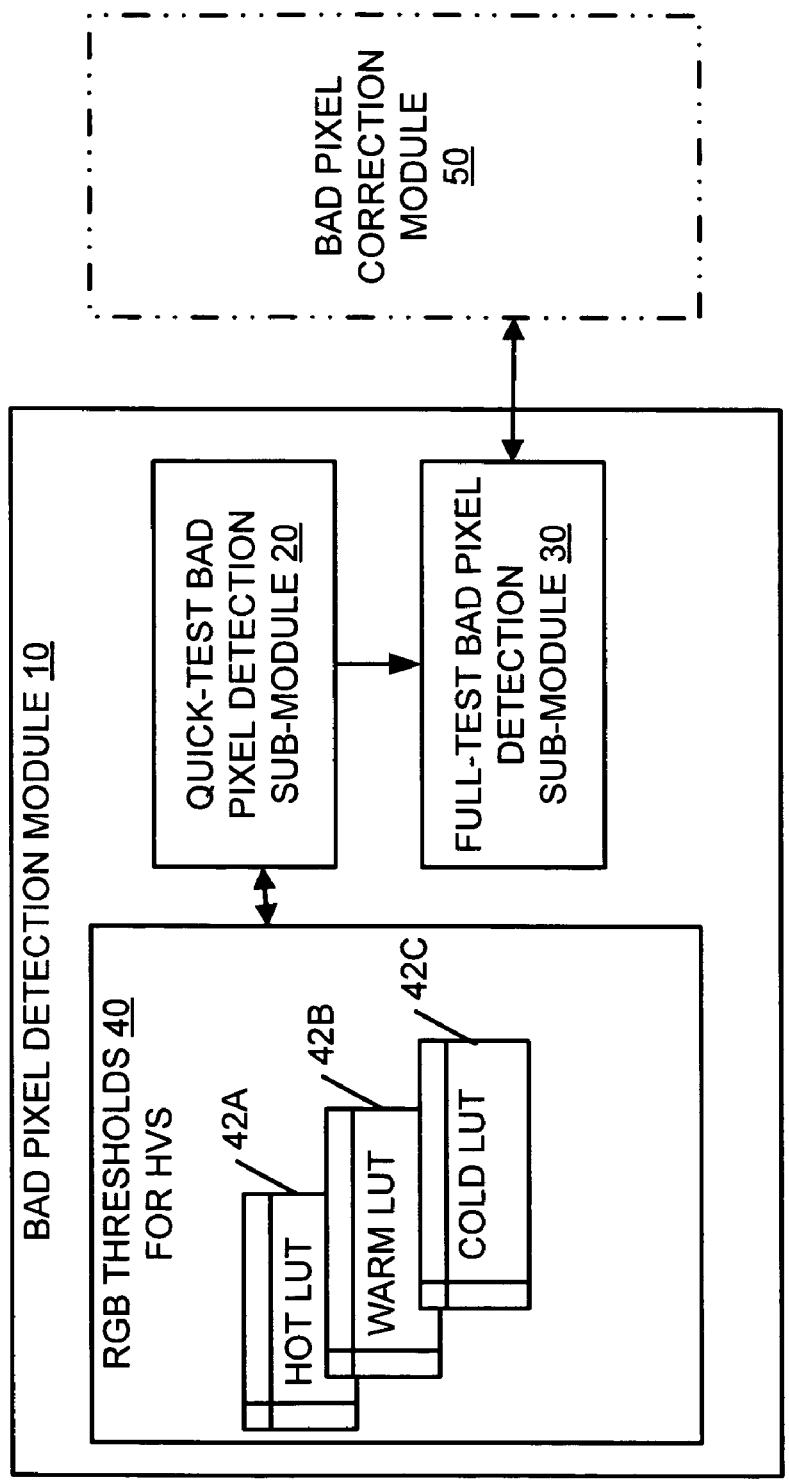
FIG. 3 illustrates a general block diagram of a bad pixel detection module interfaced with a bad pixel correction module shown in phantom.
Figure 4:
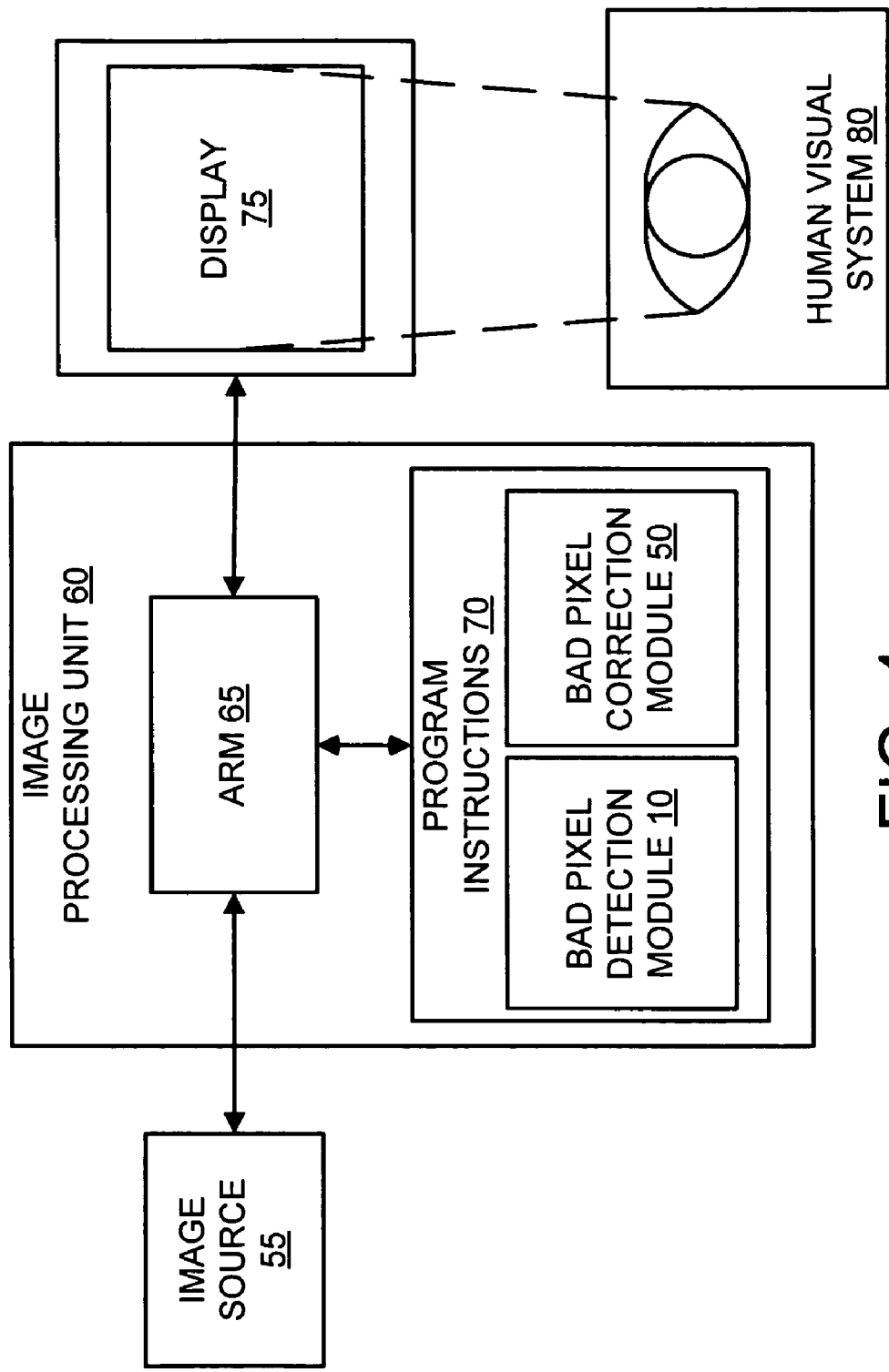
FIG. 4 illustrates a block diagram of an image processing unit.

The preferred embodiment of the method and modules for defective pixel detection based on the human visual system according to the present invention is described below with a specific application to images for a liquid crystal display (LCD). However, it will be appreciated by those of ordinary skill in the art that the present invention is also well adapted for other types of display units using a RGB pixel scheme or other pixel colors for display. Referring now to the drawings in detail, wherein like numerals are used to indicate like elements throughout, there is shown in FIGS. 3 and 4 a module for bad pixel detection, generally designated at 10, according to the present invention.

FIG. 1 shows a common Bayer pattern arrangement used by today's CCD or CMOS manufacturers. In this illustration, even rows contain alternating red and green pixels, and odd rows comprise alternating green and blue pixels. Herein, a pixel's "neighbors" is defined as adjacent pixels which are filtered to respond to the same portion of the color spectrum. For example, if checking to see if the red pixel denoted as R33 is defective, the neighboring red pixels which may or may not be examined are those red pixels denoted R11, R31, R51, R13, R53, R15, R35, R55. When checking to see if the blue pixel denoted as B44 is defective, neighboring blue pixels include those blue pixels denoted as B22, B42, B62, B24, B64, B26, B46, and B66. Finally, when examining a green pixel, e.g. G43, the green neighboring pixels are defined as those green pixel denoted as G41, G32, G52, G23, G63, G34, G54, and G45.

In the example, there are twice as many green pixels than there are blue or red pixels. The neighboring green pixels include those green pixels G32, G52, G34 and G54 which are at a distance of one (1) from the green pixel G43. The green pixels G32, 52, G34 and G54 are corner green pixels immediately bordering the green pixel G43. The green pixels G41, G23, G63, and G45 are at a distance of two (2) pixels from the green pixel G43. In this example, there are eight (8) red pixel neighbors, eight (8) blue pixel neighbors and eight (8) green pixel neighbors.

Since computing the maximum AND minimum of one's neighbors is a costly process, the bad pixel detection module 10 incorporates a quick-test bad pixel detection sub-module 20 which first compares the current or candidate pixel being processed to that of one of his neighbors already examined, in order to see if the two are within some threshold of which the difference would be unperceivable by the human visual system (HVS) 80. If so, the bad pixel detection module 10 moves on to the next pixel for a quick-test bad pixel detection (hereinafter sometimes referred to as the "quick-test method").

For example, if a given green pixel has a pixel value of 55, and has a upper-left green neighbor (already processed and known to be good) whose value is 65, then the pixel with the value 55 must either be good, or if it is in fact defective, it does not matter since the difference is too small to be detected by the HVS 80.

The bad pixel detection module 10 further includes a full-test bad pixel detection sub-module 30 which performs a full-test bad pixel detection method (herein after referred to as a "full-test.") In the exemplary embodiment, if the pixel under evaluation in the quick-test bad pixel detection sub-module 20 is found to be bad, then the bad pixel detection module 10 performs a full-test as will be described later. Nevertheless, if a pixel after the full-test is determined to be "bad" then the bad pixel is corrected by the bad pixel correction module 50 shown in phantom in FIG. 3.

When the full-test is performed the current or candidate pixel is compared against all remaining neighboring pixels of the same color. In the exemplary embodiment, the quick-text bad pixel detection sub-module, always performs the quick-text on a current or candidate pixel using a good neighbor pixel located at the upper left of the current or candidate pixel. On the other hand, the full-test will test the current or candidate pixel with the remaining seven (7) neighboring pixels.

Figure 5:
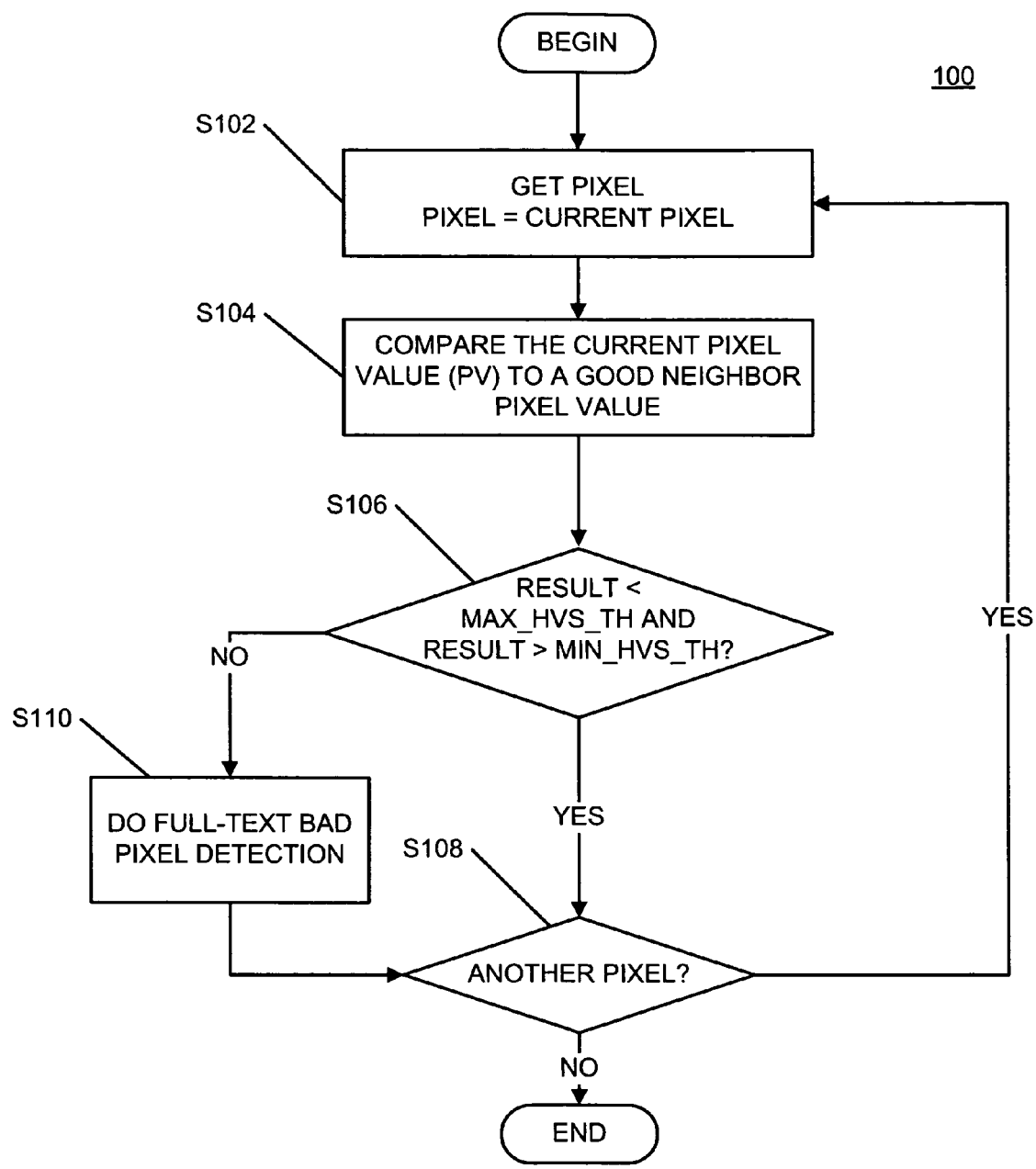
FIG. 5 illustrates a flowchart of a quick-test bad pixel detection method based on the human visual system.

Referring now to FIG. 5, the quick-test bad pixel detection method 100 will now be described in more detail. The method 100 begins with getting an untested pixel which is set as the current pixel at step S102. Step S102 is followed by step S104 where the current pixel value is compared to the good neighbor pixel value. The good neighbor pixel value is for a previously tested good neighbor of the same color. Step S104 is followed by step S106 where a determination is made whether the result (difference) of step S104 is greater/less than the max/min human visual system threshold (HVS_TH). If the determination is "YES" (which indicates that the current pixel is good), then step S106 is followed by step S108 where a determination is made whether there are any more pixels not yet tested. If the determination at step S108 is "YES," step S108 loops back or returns to step S102. Otherwise, if the determination is "NO," at step S108, the method 100 ends.

Returning to step S106, if the determination is "NO" (which indicates that the current pixel is a noticeable bad pixel), then step S106 is followed by step S110 where a full-test for bad pixel detection is performed where the current pixel is tested against the remaining seven (7) neighboring pixels.

The quick-test method 100 can be optimized by using a more lenient threshold for red pixels, and even more lenient thresholds for blue Bayer pixels, since the human eye is least sensitive to changes at these frequencies. For example, tests have shown that a red, green, blue thresholds of 16, 12, 30, respectively, works well. The RGB thresholds 40 for the human visual system 80 are used by the quick-test bad pixel detection sub-module 20.

Figure 2A:
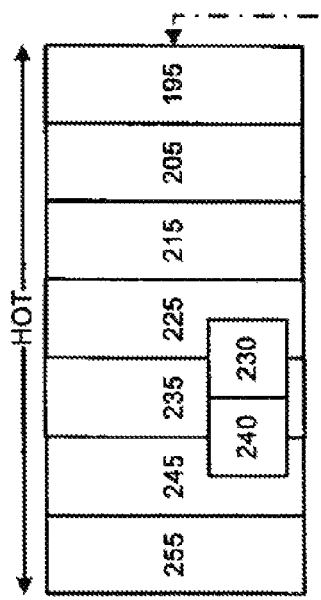
FIGS. 2A, 2B, and 2C illustrate a pixel color scale of a single color from 0 to 255 shades dissected into hot, warm and cold pixel shade categories.
Figure 2B:
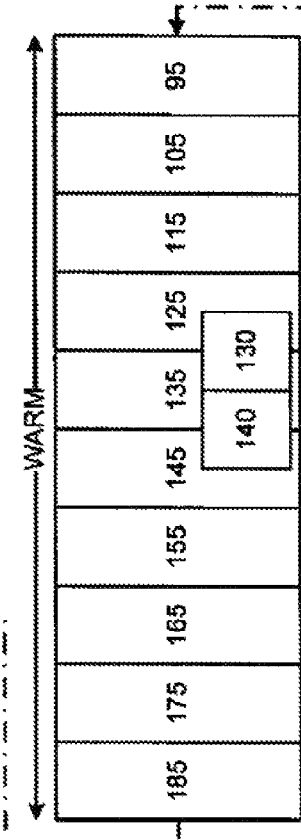
Figure 2C:
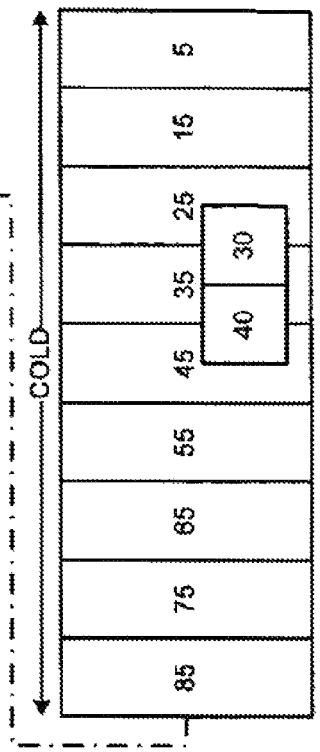

The processing times are optimized in the bad pixel detection module 10 by utilizing the thresholds in hot, warm and cold lookup tables 42A, 42B and 42C. The hot, warm and cold lookup tables 42A, 42B and 42C include HVS thresholds for red, blue and green pixels based on whether the pixel value is hot, warm and cold. FIGS. 2A, 2B, and 2C illustrate a pixel color scale of a single color from 0 to 255 shades dissected into the hot, warm and cold shade categories, respectively. A pixel value (PV) of zero (0) represents the coldest pixel value. On the other hand, a pixel value of 255 represents the hottest pixel value. The pixel color scale from 0 to 255 may be for any single color such as red, green, blue, white, black, etc.

The boxes denoted as 230, 240 in FIG. 2A, 130, 140 in FIG. 2B and 30, 40 in FIG. 2C correspond to pixel values 240, 230, 240, 130, 40, 30 in TABLES 1, 2 and 3 below. Each box includes approximately half of the pixel values between two adjacent shades of the same color. For example, box 30 includes pixel values from 26-35 or 25-34. On the other hand, the pixel values of box 40 includes the pixel values 36-45 or 35-44. Nevertheless, TABLES 1, 2, 3 may include an entry for each and every pixel value in the range of 0-255 or other scales of pixel shades. As will be seen from the TABLES 1, 2, and 3 below, the HVS threshold becomes more lenient as the pixel value magnitude increases.

These HVS thresholds for pixel values in the hot range are shown in Table 1 below.

TABLE 1

| | PIXEL VALUE (HOT RANGE) | | | | | | |
|---|---|---|---|---|---|---|---|
| | 190 | 200 | 210 | 220 | 230 | 240 | 250 |
| RED_HVS THRESHOLD | 18 | 18 | 20 | 22 | 22 | 22 | 22 |
| GREEN_HVS THRESHOLD | 18 | 18 | 18 | 20 | 20 | 20 | 20 |
| BLUE_HVS THRESHOLD | 32 | 32 | 32 | 32 | 32 | 34 | 34 |

The HVS thresholds for pixel values in the warm range is shown in Table 2 below.

TABLE 2

| | PIXEL VALUE (WARM RANGE) | | | | | | | | | |
|---|---|---|---|---|---|---|---|---|---|---|
| | 90 | 100 | 110 | 120 | 130 | 140 | 150 | 160 | 170 | 180 |
| RED_HVS THRESHOLD | 16 | 16 | 16 | 16 | 16 | 16 | 16 | 16 | 16 | 16 |
| GREEN_HVS THRESHOLD | 12 | 12 | 12 | 12 | 12 | 12 | 12 | 12 | 16 | 16 |
| BLUE_HVS THRESHOLD | 32 | 30 | 30 | 30 | 30 | 30 | 30 | 30 | 32 | 32 |

The HVS thresholds for pixel values in the cold range is shown in Table 3 below.

TABLE 3

| | PIXEL VALUE (COLD RANGE) | | | | | | | |
|---|---|---|---|---|---|---|---|---|
| | 10 | 20 | 30 | 40 | 50 | 60 | 70 | 80 |
| RED_HVS THRESHOLD | 25 | 25 | 25 | 25 | 22 | 22 | 20 | 18 |
| GREEN_HVS THRESHOLD | 25 | 25 | 20 | 20 | 20 | 18 | 16 | 16 |
| BLUE_HVS THRESHOLD | 35 | 35 | 35 | 35 | 35 | 32 | 32 | 32 |

The red, blue and green HVS thresholds are used to define the maximum increase and decrease differences during the quick-test The result of the comparison between the current pixel value and the one good neighbor pixel value creates a difference between the two pixel values that is representative of either an increase or a decrease. The maximum pixel difference increase and the maximum pixel difference decrease for red pixels are denoted as MAX_PIX_DIFF_INC_R and MAX_PIX_DIFF_DEC_R. The maximum pixel difference increase and the maximum pixel difference decrease for a blue pixel is denoted as MAX_PIX_DIFF_INC_B and MAX_PIX_DIFF_DEC_B. The maximum pixel difference increase and the maximum pixel difference decrease for a green pixel is denoted as MAX_PIX_DIFF_INC_G and MAX_PIX_DIFF_DEC_G. For a pixel value of 120, which is a warm pixel value for red, green and blue pixels, the MAX_PIX_DIFF_INC_R is 16, the MAX_PIX_DIFF_INC_G is 12 and the MAX_PIX_DIFF_INC_B is 30. Likewise, for a pixel value of 120 for red, green and blue pixels, the MAX_PIX_DIFF_DEC_R is −16, the MAX_PIX_DIFF_DEC_G is −12 and the MAX_PIX_DIFF_DEC_B is −30.

The threshold values in TABLES 1, 2 and 3 above define the MAX_PIX_DIFF_INC and MAX_PIX_DIFF_DEC (which is the negative of the threshold value in the TABLES 1, 2 and 3).

Figure 6:
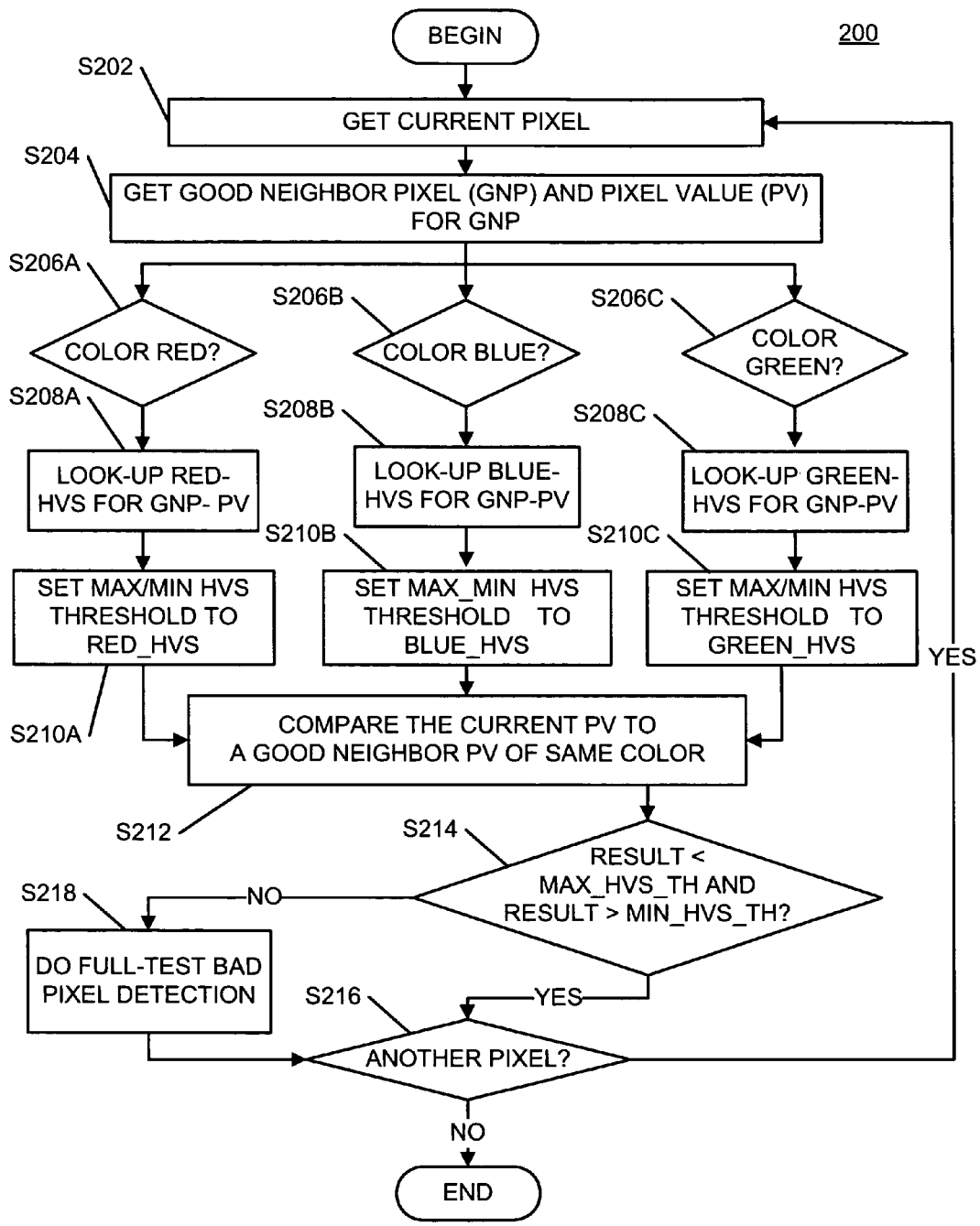
FIG. 6 illustrates a flowchart of an optimized quick-test bad pixel detection method based on the human visual system and optimized for RGB hot, warm and cold pixel shades.

Referring now to FIG. 6, the optimized quick-test bad pixel detection method 200 will now be described in detail. The method 200 begins with getting an untested pixel which is set as the current pixel at step S202. Step S202 is followed by step S204 where the pixel value for the one good neighbor pixel (GNP) is obtained. In the example, the upper-left good neighbor pixel is used as a reference point. Step S204 is followed by one of the steps S206A, 206B, and 206C to determine whether the GNP pixel is red, blue or green, respectively. If the GNP pixel is red, then step S206A is followed by steps 208A where the red HVS threshold for the corresponding pixel value of the GNP is obtained from the hot, warm and cold lookup tables 42A, 42B and 42C.

For example, if the GNP is red and has a pixel value of 30, the red HVS threshold is 25 (see TABLE 3). Step S208A is followed by step S210A where the max/min HVS threshold (HVS TH) is set to the red HVS threshold from the hot, warm and cold lookup tables 42A, 42B and 42C.

If the GNP pixel is blue as determined at step S206B, then step S206B is followed by steps 208B where the blue HVS threshold for the corresponding pixel value is obtained from the hot, warm and cold lookup tables 42a, 42b and 42c. For example, if the GNP is blue) and has a pixel value of 230, the blue HVS threshold is 32 (see TABLE 1). Step S208B is followed by step S210B where the max/min HVS threshold (HVS TH) is set to the blue HVS threshold from the hot, warm and cold lookup tables 42A, 42B and 42C.

If the GNP is green as determined at step S206C, then step S206C is followed by steps 208C where the green HVS threshold for the corresponding pixel value is obtained from the hot, warm and cold lookup tables 42a, 42b and 42c. For example, if the GNP is green and has a pixel value of 40, the green HVS threshold is 20 (see TABLE 3). Step S208C is followed by step S210C where the max/min HVS threshold (HVS TH) is set to the green HVS threshold from the hot, warm and cold lookup tables 42A, 42B and 42C.

The RGB HVS thresholds in TABLES 1, 2 and 3 are selected such that zero noticeable false negatives are produced.

Steps S210A, 210B, and 210C are followed by step S212 where the current pixel value (red, blue or green) is compared to one good neighbor pixel value. Step S212 is followed by step S214 where a determination is made whether the result (difference) of step S212 is greater/less than the max/min human visual system threshold (HVS TH) from one of steps S210A, 210B, and 210C. As can be appreciated, the comparison step S212 can be moved to begin immediately after step S204.

When determining whether the result is greater/less than the HVS TH, the determination evaluates whether the result is less than the MAX_PIX_DIFF_INC or whether the result is greater than the MAX_PIX_DIFF_DEC. If the determination is "YES" (which means the current pixel is good or not noticeable), then step S214 is followed by step S216 where a determination is made whether there are any more pixels not yet tested. If the determination at step S216 is "YES," step S216 loops back or returns to step S202 where the next untested pixel is evaluated. Otherwise, if the determination is "NO," at step S216, the method 200 ends.

Returning to step S214, if the determination is "NO" (which means the current pixel is bad or noticeable) then step S214 is followed by step S218 where a full-test for bad pixel detection is performed by the full-test bad pixel detection sub-module 30.

Referring now to FIG. 4. the image processing unit 60 includes an Advanced RISC Machine (ARM) 65 or other processing device which is coupled to program instructions 70 and display 75, such as without limitation, a liquid crystal display (LCD). The ARM 65 is coupled to an image source 55 providing an image of pixels subjected to image processing by the image processing unit 60. The program instructions 70 upon execution by the ARM 65 are operable to function as the bad pixel detection module 10 and the bad pixel correction module 50. Thus, the program instructions 70, upon execution, are operable to perform the quick-test and the full-test for bad pixel detection.

In operation, exploiting the HVS 80 to minimize the need to compute the min and max of each pixel's neighbors helped speed up bad pixel correction on the Advanced RISC Machine (ARM) 2.6 times faster.

It will be appreciated by those of ordinary skill in the art that by the module, method and program instructions disclosed herein, the detection of bad pixels is accomplished considerably faster than in the conventional art. The speed at which bad pixel detection is performed can be optimized over prior methods by exploiting weaknesses in the human visual system. The process for defective pixel detection according to the present invention is also more economical than the conventional process, for example, which requires computation of maximum and minimum of neighboring pixel values.

The foregoing description of the embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A bad pixel detection module in an image processing unit, the module comprising:
   a quick-test bad pixel detection sub-module operable to compare a difference between a pixel value of a current pixel in an image and a pixel value of only one good neighbor pixel to a threshold selected to create zero noticeable bad pixels in the image,
   wherein the image processing unit is operable to execute the module.

2. The module of claim 1; further comprising a full-test bad pixel detection sub-module operable to full-test the current pixel to evaluate whether the current pixel is a bad pixel in a kernel only if the current pixel fails the quick-test.

3. The module of claim 2; wherein the quick-test bad pixel detection sub-module is operable to terminate testing of the current pixel when the difference is out of the range of the threshold, the current pixel being the noticeable bad pixel; and the full-test bad pixel detection sub-module is operable to resume testing of the noticeable bad pixel.

4. The module of claim 1; wherein the good neighbor pixel is for a previously tested good neighbor pixel.

5. The module of claim 1; wherein the quick-test bad pixel detection sub-module is further operable to terminate testing of the current pixel if the difference is within a range of the threshold, and is further operable to begin testing of a new pixel, the new pixel becoming the current pixel.

6. The module of claim 1; further comprising at least one lookup table for selecting the threshold, the at least one lookup table comprising a plurality of pixel values divided into hot, warm and cold pixel values, and each pixel value having a corresponding threshold wherein the corresponding threshold is more lenient as a magnitude of the plurality of pixel values increases.

7. The module of claim 5; wherein the corresponding threshold for each pixel value of a blue color is more lenient than the corresponding threshold for each pixel value of the plurality of pixel values for a red color and a green color.

8. The module of claim 6; wherein the corresponding threshold for some pixel values of the red color is more lenient than the corresponding threshold for the green color.

9. A bad pixel detection module in an image processing unit, the module comprising:
   a quick-test bad pixel detection sub-module operable to compare a difference between a current pixel value of a color in an image and one good neighbor pixel value of the color to a threshold based on a human visual system response to the color to create zero noticeable bad pixels in the image; and a full-test bad pixel detection sub-module operable to evaluate whether a noticeable bad pixel is a bad pixel in a kernel by a full-test of the kernel, wherein the image processing unit is operable to execute the module.

10. The module of claim 9; wherein the quick-test bad pixel detection sub-module is operable to compare the current pixel value to one and only one previously tested good neighbor pixel value.

11. The module of claim 10; wherein the quick-test bad pixel detection sub-module is further operable to terminate testing of a current pixel having the current pixel value if the difference is within a range of the threshold, and is further operable to begin testing of a new pixel having a new pixel value, the new pixel value becoming the current pixel value.

12. The module of claim 11; wherein the quick-test bad pixel detection sub-module is operable to terminate testing of the current pixel when the difference is out of the range of the threshold and is thereby a noticeable bad pixel; and the full-test bad pixel detection sub-module is operable to resume testing of the noticeable bad pixel against remaining pixel neighbors in the kernel.

13. The module of claim 9; wherein the quick-test bad pixel detection sub-module further comprises at least one lookup table of the color, the color comprises a plurality of pixel values divided into hot, warm and cold pixel values, each pixel value mapping to a respective threshold wherein the respective threshold is more lenient as a magnitude of the plurality of pixel values increases.

14. The module of claim 13; wherein the threshold for each pixel value of a blue color is more lenient than the threshold for a red color and a green color.

15. The module of claim 14; wherein the threshold for some pixel values of the red color is more lenient than the threshold for the green color.

16. A bad pixel detection module in an image processing unit, the module comprising:

quick-testing means for quick-testing a current pixel by comparing a difference between a current pixel value of a color in an image and one good neighbor pixel value of the color to a threshold based on a human visual system response to the color to create zero noticeable bad pixels in the image; and full-testing means for full-testing a noticeable bad pixel to evaluate whether the noticeable bad pixel is a bad pixel in a kernel, wherein the image processing unit is operable to execute the module.

17. The module of claim 16; wherein the quick-testing means compares the current pixel value to one and only one previously tested good neighbor pixel value.

18. The module of claim 17; wherein the quick-testing means includes terminating means for terminating testing of the current pixel if the difference is within a range of the threshold; and means for beginning testing of a new pixel having a new pixel value, the new pixel value becoming the current pixel value.

19. The module of claim 18; wherein the terminating means includes means for terminating testing of the current pixel when the difference is out of the range of the largest threshold and is thereby a noticeable bad pixel; and wherein the full-testing means includes means for resuming testing of the noticeable bad pixel.

20. The module of claim 16; further comprising means for looking up the threshold for the color, wherein the color comprises a plurality of pixel shades divided into hot, warm and cold pixel values stored in at least one lookup table, and wherein each pixel value maps to a respective threshold.

21. The module of claim 20; wherein the threshold for each pixel shade of a blue color is more lenient than the threshold for a red color and a green color.

22. The module of claim 21; wherein the threshold for some pixel shades of the red color is more lenient than the threshold for the green color.

23. A method for bad pixel detection comprising:
under control of at least one configured processing device,
quick testing a current pixel by comparing a difference between a current pixel value of a color in an image and one good neighbor pixel value of the color to a threshold based on a human visual system response to the color to create zero noticeable bad pixels in the image; and
full testing a noticeable bad pixel to evaluate whether the noticeable bad pixel is a bad pixel in a kernel.

24. The method of claim 23; wherein the quick testing step comprises the step of comparing the current pixel value to one and only one previously tested good neighbor pixel value.

25. The method of claim 23; wherein the quick testing step comprises the steps of terminating testing of a current pixel having the current pixel value if the difference is within a range of the threshold, and beginning testing of a new pixel having a new pixel value, the new pixel value becoming the current pixel value.

26. The method of claim 25; wherein the step of terminating testing includes the step of terminating testing of the current pixel when the difference is out of the range of the threshold and is thereby a noticeable bad pixel; and wherein the full testing step includes the step of resuming testing of the noticeable bad pixel.

27. The method of claim 23; wherein the quick testing step comprises the step of looking up the threshold from at least one lookup table wherein the color comprises a plurality of pixel shades divided into hot, warm and cold pixel values stored in the at least one lookup table and wherein each pixel value maps to a respective threshold.

28. The method of claim 27; wherein the threshold for each pixel shade of a blue color is more lenient than the threshold for a red color and a green color.

29. The method of claim 26; wherein the threshold for some pixel shades of the red color are more lenient than the threshold for the green color.

* * * * *